Oct. 11, 1938.        J. V. GIL        2,132,768
PRIME MOVER DYNAMO PLANT
Filed Sept. 17, 1937
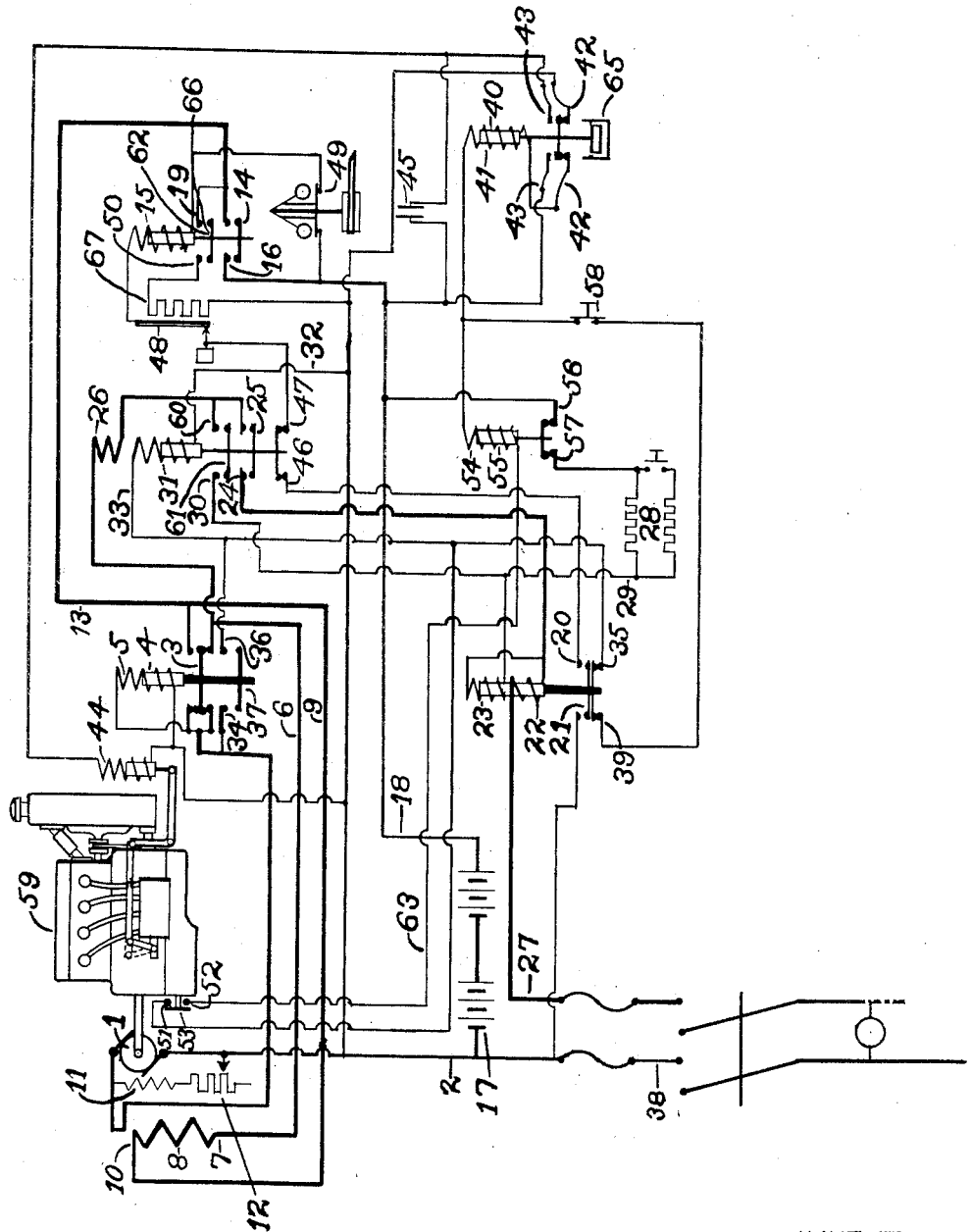
INVENTOR,
JOSEPH V. GIL
BY Lyman C. Conger
ATTORNEY.

Patented Oct. 11, 1938

2,132,768

UNITED STATES PATENT OFFICE 2,132,768

PRIME MOVER DYNAMO PLANT

Joseph Valderrame Gil, Esher, England

Application September 17, 1937, Serial No. 164,301
In Great Britain October 10, 1936

7 Claims. (Cl. 290—30)

This invention relates to self-contained electric generating systems such as are used for supplying electric current where a public supply is not available and of the kind which employ a prime mover coupled to a generator and including a battery, the external load circuit being supplied direct by the generator.

Automatic generating systems of the above kind are known employing a dynamo having two oppositely wound series field windings in addition to the usual shunt winding, one series field winding being used for motoring and the other for compounding when generating. Another known system employs a two-part dynamo with which a second armature mechanically coupled to the first is used for motoring the combination when self-starting.

The object of the invention is to provide an improved and simplified system of the above kind which is particularly suited for use where the prime mover consists of a compression ignition engine, such as a Diesel engine, and with which it is possible to start the prime mover electrically by utilizing current from a low voltage storage battery (e. g. having a voltage substantially lower than that of the generator), the external load circuit being supplied direct from the generator.

The invention consists in a self-contained electric generating system of the kind referred to wherein the generator has a series and a shunt field winding and operates as a compound wound dynamo when generating and means is provided for transposing the connections between the generator armature and the series field winding in order that the generator may act as a motor for starting the prime mover.

The invention also consists in the further features hereinafter described or indicated and claimed.

In carrying the invention into effect one convenient manner is as illustrated in the accompanying diagram, which is a diagrammatic representation of the system in connection with a prime mover.

The armature 1 of a compound wound generator is driven by a prime mover 59, preferably of the compression ignition type, which generator has its negative pole connected direct by means of a lead 2 to one of the supply feeders 38 and has its positive pole connected to the armature 3 of a single pole two-way switch 4 operated by a coil 5. The armature 3 of the switch 4 has two positions. In one position, in which it is held by gravity and spring control, the armature is connected by a lead 6 to one end 7 of the series field 8 of the generator, while in the other position of the armature 3, to which it can be drawn by the excitation of the coil 5, the armature makes a connection with a lead 9 to the other end 10 of the series field 8. The generator is provided with the usual shunt winding 11 and series resistance 12, the field and the resistance being connected across the positive and negative poles of the generator armature 1. One pole of the operating coil 5 is connected to the armature 3 while the other pole of this coil is connected to the negative pole of the generator. The end 10 of the series field 8 is connected by a lead 13 with the operating armature 14 of a contactor operated by a coil 15, the armature 14 being adapted, when the coil 15 is energized, to make contact with a contact 16 connected to the positive pole of a low voltage storage battery 17 by a lead 18.

The armature 62, mechanically connected to the armature 14, is adapted to make contact with contact 19, the purpose of which will be hereinafter explained. One pole of the operating coil 15 is connected through contacts 49, to be described later, to the contact 16 while the other pole of the coil 15 is connected through a thermostatic safety switch 48 and through contacts 46 and 47, to be described later, with a contact 20 of an electrically operated switch having an armature 21 which is designed to close a circuit to the negative pole of the generator through the lead 2 and with the negative pole of the battery 17.

The switch arm 21 is under the control of a main operating coil 22 and a supplementary coil 23, one end of the coil 22 being connected to one end of the coil 23 and to a contact 24 of an electrically operated switch, the armature 25 of which is connected through its series holding-in coil 26 to the end 7 of the generator series field 8. That pole of the operating coil 22 which is not connected to the contact 24 is connected to the other main supply feeder 27. The external load is connected between the feeders 38 and 27. The end of the operating coil 23 which is not connected to the contact 24 is connected to the positive pole of the battery 17 through a resistance 28 through contacts 56 and 57, to be described later, and lead 18, there being a connection from the lead 29 between the coil 23 and the resistance 28 to a supplementary contact 30 between which and the contact 60 the armature 61 is adapted to make contact when the switch is in the closed position.

The switch is operated by a coil 31, one pole of which is connected by a lead 32 with the negative pole of the generator and the other pole of which is connected by a lead 33 with a supplementary contact 36 on the switch 4 and with a contact 35 which is adapted to make contact with contact 39 when the armature 21 is in its released position. A further contact 34 on the contactor 4 is connected to the positive pole of the generator armature. Contacts 34, 36 are adapted to be connected together by armature 37 when the coil 5 is energized.

The circuits above described are those necessary for the automatic starting of the prime mover, such as a Diesel engine, when a load is connected between the feeders 38 and 27, and the operation of this portion of the apparatus will now be described. When a load is connected between the feeders 38 and 27 current flows from the battery 17 through the supplementary coil 23 and the coil 22 whereby the switch arm 21 is moved so as to make contact with the contact 20. Current thereupon flows from the battery through lead 18, contacts 49, coil 15, thermostatic element 48, contact 20 and lead 2 so that the armature 14 is moved to make contact with the contact 16. Current now flows from the battery 17 through lead 18, contact 16, armature 14 and lead 13 to the series field 8. The end 10 of the series field is, in the stopped position of the plant, not directly connected to the generator armature, and, therefore, current flows through lead 6 and armature 3 to the positive pole of the generator armature. The generator now acts as a motor and, with this direction of current through the series field, rotates the prime mover in the proper running direction.

It will here be noted that current from the lead 13, via the armature 3, also flows through coil 5, but since the potential of the battery is lower than that developed by the generator under normal running conditions, the coil 5 is not energized to a sufficient extent to move the armature 3. When the prime mover starts and has accelerated sufficiently contacts 49 are opened by centrifugal action, and coil 15 is thereby de-energized allowing armature 14 to leave contact 16, prime mover now running under its own power. When the generator commences to generate, the potential across the coil 5 increases and the armature 3 is allowed to move so that it completes the circuit, through the lead 9, between the end 10 of the series field and the positive pole of the generator armature and separates from the lead 6.

In this position the contacts 34 and 36 are closed by the armature 37 connected to the arm 3 and current flows from the positive pole of the generator armature to the coil 31. Energization of coil 31 causes the arm 25 to make contact with the contact 24 and, in consequence, load current is supplied to the feeder 27 through the series field 8. It will be noted that with the new position of the armature 3 the connections to the series field 8 have been transposed so that in the series field 8 the load current produces the same magnetic polarity as when the motoring current was passing. The generator now operates as a compound wound dynamo and the load circuit includes the armature 3, lead 9, series field 8, coil 26, contacts 25, 24 and relay coil 22.

In order to insure that the apparatus is fully automatic it is necessary to provide means for shutting down the installation when the last load has been taken off the feeders 38 and 27. As above described, the load current passes through the relay coil 22 which holds the armature 21 so that contacts 35, 39 are separated as long as the external load is maintained, but this armature is released as soon as current is no longer supplied to the feeders 38 and 27. The armature 21 in its released position is adapted to effect electrical connection between the contact 35 and a contact 39 so that the operating coil 40 of an electrically operated switch 41 is energized by the generator.

The operating coil 40 may be a solenoid as indicated on the diagram, or it may be a heating winding. This switch 41 comprises two pairs of contacts 42, 43, one pair of contacts being electrically connected together when the other pair are open-circuited. Such an arrangement can conveniently be achieved by the use of a conventional mercury type switch. When the coil 40 is energized upon the removal of external load the pair of contacts 42 become disconnected while the other pair 43 are connected together.

Under these circumstances, the coil 40 is immediately deenergized, but the switch only reverts to the position shown in the drawing after a predetermined period of delay which is insured by the use of timing means, as, for example, a clockwork mechanism or a dashpot 65 or the like. The connecting together of the pair of contacts 43 permits battery current to flow in a subsidiary circuit from the lead 18 through the contacts 43 and through an operating coil 44 which, while energized, is adapted to move the fuel control rod of the prime mover into the shut position, such action being preferably against a return force which tends to cause the fuel control rod to move into the open position. So long as the coil 44 is energized the fuel to the prime mover is shut off and the timing means incorporated with the switch 41 may be so adjusted as to insure that the coil 44 is energized for a slightly longer time than that required for the prime mover completely to stop. After this delay period the contact pairs 42 and 43 return to their initial position which is that shown in the drawing. As soon as the generator ceases to generate, the operating coil 5 is de-magnetized; thus automatically allowing the spring and gravity control of the armature 3 of the switch 4 to move the armature and so transpose the series field connections ready for the next start. It is to be noted that the switch 4 may be of a very simple single pole type having very small travel of its operating arm, and allowing one contact to make before the other is broken.

To absorb the inductive "kick" upon the opening of the contacts 43 by which the coil 44 is de-energized, a neon lamp 45 may be connected across the terminals of the coil 44 or across the contacts 43 as shown on the drawing. An important advantage of the above described arrangement is that when the coil 40 is energized to move the contact pairs 42 and 43 the current energizing the coil and flowing through the contacts 35 and 39 is broken at the contact pair 42 and not at the contacts 35 and 39 so that the arm 21 may be made extremely light and sensitive since it is only required to deal with a very small and momentary current, and never to interrupt the circuit.

Where the requirements are not so stringent (e. g. with subnormal voltages) the contact 42 may be omitted, and the points to which it is shown connected (in the diagram) permanently joined together electrically.

In order to provide suitable safeguards, protective means are employed which will now be described. Contact 20, which is engaged by armature 21 when a load is connected across the feeders 38 and 27, is connected to a contact 46 which is electrically connected to a further contact 47 when the coil 31 is de-energized. This insures that coil 15 cannot be energized once armature 25 engages contact 24. Contact 47 is in turn electrically connected to one pole of a thermal relay switch 48 which may also be provided with an over-riding manual control, the other pole of this switch being connected to one pole of the coil 15. The other pole of the coil 15 is connected to one pole of a switch 49 which is controlled by a centrifugal governor or like speed sensitive device driven by the prime mover, the contacts of this switch being closed when the prime mover is stopped. The other contact of this switch 49 is connected to the positive terminal of the battery 17. The current for the thermal relay switch 48 is taken from the contact 19 connected by armature 66 to a contact 50 connected with the heating element 67 of the thermal switch 48, the other pole of which is connected to the negative terminal of the battery 17. This operates to protect the battery from undue discharge during starting, as follows:

As above described, upon application of a load across the feeders 38, 27, the contact 19 is connected with the contact 50. The thermal relay switch 48 is closed, as is also the switch 49 controlled by the speed sensitive device on the prime mover. Current is supplied from the battery 17 to the heating element 67 of the thermal relay, and to the generator to cause it to motor the prime mover.

In the event of the prime mover not starting quickly, the heater of the thermal relay switch opens this switch so as to deenergize the coil 15 and thus prevent further flow of current from the battery to the generator. On the contary, if the prime mover starts, the switch 49 is opened, whereupon the coil 15 is de-energized, the armature 14 leaves the contact 16 and the battery is no longer directly connected either to the generator or to the thermal relay.

As soon as the generator reaches normal speed the following sequence of events occurs:
1. The automatic transposal of the connections to the generator series field 8 under the action of coil 5.
2. The joining of terminals 34 and 36 by armature 37.
3. The energizing by the generator of coil 31.
4. The engagement of contacts 25 with 24 and 60 with 30.

This final stage short circuits coil 23 but the supply of current from the generator to the external load maintains the arm 21 in contact with the contact 20 by reason of the energization of coil 22, and the arm 25 remains in contact with the contact 24. Simultaneously the supplementary contact 60 is electrically connected with the contact 30 so that current from the generator may pass through the resistance 28 so as to give a "trickle" charge to the battery during the time that the generator is operative. The amount of this "trickle" charge may be varied, as for example by cutting out a portion of the resistance 28.

As a further protective feature means may be employed to shut down the plant if failure occurs in the lubricating system of the prime mover. This may be effected by causing the oil pressure to hold open the contacts 51, 52 of a switch 53 (these contacts and the switch 53 being provided in a lead 63 connected at its ends respectively to the contact 35 and to the coil 40) so that on failure of the pressure, current is supplied from the dynamo through the closed switch 53 to the coil 40 to initiate the sequence of stopping operations as above described.

In this circuit there may be included the operating coil 54 of an indicating automatic circuit breaker 55 the contacts 56, 57 of which are connected in the circuit between the battery 17 and the coil 23 so as to prevent the automatic restarting of the plant until the circuit breaker has been re-set by hand after the failure of the lubricating system has been rectified. A similar arrangement could be employed to shut down the plant in the event of the prime mover becoming over-heated. In this case the contacts 51, 52 can be held open by a thermostatic device responsive to the temperature of the cooling medium, the contacts being closed when the medium reaches a pre-determined high temperature.

Further, in order to be able to start the prime mover by hand, a simple switch 58 may be provided in the automatic stopping circuit so that upon opening this switch the prime mover will continue to run, even if there is no load on the feeders 27 and 38.

Having now particularly described and ascertained the nature of my said invention and in what manner the same is to be performed, I declare that what I claim is:

1. A prime mover dynamo plant comprising a generator, a prime mover of the compression ignition type, electrically energized relay means for shutting off the fuel supply to the prime mover and delay acting means for returning said relay means to its original position, the delay period being longer than required for the prime mover to stop completely.

2. A prime mover dynamo plant comprising a generator, a prime mover of the compression ignition type, electrically actuated means for shutting off the fuel supply to said prime mover, a circuit comprising said means, a source of electric current and a switch adapted to close said circuit when actuated, and means for returning said switch to its original position upon stoppage of said prime mover, said switch returning means being under the control of a delay producing device.

3. A prime mover dynamo plant comprising a prime mover of the compression ignition type, a battery, a generator, supply mains leading from said generator, one or more sources of current demand on said supply mains, means actuated by current from said battery and responsive to a current demand in said mains for starting said prime mover, electrically operated means for shunting off the fuel supply to the prime mover and delay acting means for returning said last mentioned means to its original position, the delay period being longer than required for the prime mover to stop completely.

4. A prime mover dynamo plant comprising a prime mover, a battery, a generator, means controlled by an external switch and actuated by current from said battery for starting said prime mover, electrically actuated means for shunting off the fuel supply to said prime mover, a circuit comprising said means, a source of electric current and a switch adapted to close said circuit when actuated, and means for returning said switch to its original position upon stoppage of said prime mover, said switch returning means being under the control of a delay producing device.

5. A prime mover dynamo plant comprising a prime mover, a battery, a generator, means actuated by current from said battery for starting said prime mover, a control circuit for said starting means comprising a pair of contacts actuated by a centrifugal governor, electrically operated means for shutting off the fuel supply to the prime mover and delay acting means for returning said last mentioned means to its original position, the delay period being longer than required for the prime mover to stop completely.

6. A prime mover dynamo plant comprising a prime mover, a battery, a generator, means actuated by current from said battery for starting said prime mover, a control circuit for said starting means comprising a pair of contacts actuated by a centrifugal governor and a thermal switch adapted to automatically terminate the supply of current from the battery if the prime mover fails to start within a predetermined time, electrically operated means for shunting off the fuel supply to the prime mover and delay acting means for returning said last mentioned means to its original position, the delay period being longer than required for the prime mover to stop completely.

7. A prime mover dynamo plant comprising a prime mover, a generator, a battery, means actuated by current from said battery for starting said prime mover, and means for shutting off the supply of fuel to said prime mover, said means comprising a solenoid adapted when energized to actuate fuel supply control means, electrically operated means for closing an electrical circuit to said solenoid, delay acting means for returning said circuit closing means to its original position and a neon lamp connected across said solenoid whereby to absorb the inductive "kick" when said solenoid is de-energized.

JOSEPH VALDERRAME GIL.